United States Patent [19]

Tsuda

[11] 4,015,948

[45] Apr. 5, 1977

[54] COPPER-BASE SOLDER

[76] Inventor: Masatoshi Tsuda, No. 6, Minamiichi-iocho Taishogun, Kita, Kyota, Japan

[22] Filed: Aug. 6, 1975

[21] Appl. No.: 602,532

Related U.S. Application Data

[63] Continuation-in-part of Ser. No. 430,708, Jan. 4, 1974, abandoned.

[52] U.S. Cl. .............................. 75/157.5; 75/161; 75/164; 148/32
[51] Int. Cl.² .......................................... C22C 9/05
[58] Field of Search .................. 75/157.5, 161, 164; 148/32, 32.5; 29/193

[56] References Cited

UNITED STATES PATENTS

| | | | |
|---|---|---|---|
| 2,482,423 | 9/1949 | Malcolm | 75/164 |
| 3,676,088 | 7/1972 | Pryor | 29/199 |

FOREIGN PATENTS OR APPLICATIONS

| | | | |
|---|---|---|---|
| 62,889 | 1949 | Netherlands | 75/157.5 |
| 273,463 | 1951 | Switzerland | 75/157.5 |
| 838,762 | 6/1960 | United Kingdom | 75/157.5 |

OTHER PUBLICATIONS

"Constitution of Binary Alloys", Hansen–McGraw–Hill Book Co., 1958, 2nd Edition, pp. 596–599.
Transactions of AIME, 1947, vol. 171, pp. 105–117.
Transactions of the Indian Institute of Metals, 9/66; pp. 141 & 142.

*Primary Examiner*—Arthur J. Steiner
*Attorney, Agent, or Firm*—Oldham & Oldham Co.

[57] ABSTRACT

A copper-base ternary alloy is provided which has a melting point lying between those of so-called hard and soft solders, exhibits excellent mechanical properties and is usable to advantage as a joining material to form mechanically reliable joints. The melting point of the alloy can be modified somewhat by changing its zinc content.

3 Claims, 12 Drawing Figures

Cu : 65%  (X176)
Mn : 35%

Cu : 64%  (X176)
Mn : 34%
Zn : 2%

Cu : 63%  (X176)
Mn : 33%
Zn : 4%

Cu : 62%  (X176)
Mn : 32%
Zn : 6%

Cu : 60% (X176)
Mn : 32%
Zn : 8%

Cu : 60% (X176)
Mn : 30%
Zn : 10%

●— Melting Point
○— Wetting Characteristic

Reduction Rate (X100) by Rolling 90%

Reduction Rate (X100) by Rolling 97%

Cu: 60%    (X176)
Mn: 30%
Zn: 10%
Ti: none added

Cu: 60%    (X176)
Mn: 30%
Zn: 10%
Ti: 0.5%

COPPER-BASE SOLDER

CROSS REFERENCE

This application is a continuation-in-part of U.S. Patent application Ser. No. 430,708 filed Jan. 4, 1974, for "Copper-Base Solder Alloy," now abandoned.

BACKGROUND OF THE INVENTION

This invention relates to improvements in solder alloys containing copper as a major constituent.

Solders are generally classified according to the melting temperature into two groups: hard solders including iron and copper-base solders and soft solders such as low-melting-point solders containing tin as a major constituent.

Low-melting-point solders are desirable for ease of soldering operation but are poor in mechanical strengths while hard solders, such as iron and copper solders have both a melting point exceeding 1000° C. though they exhibit good mechanical strengths. Yet other solders containing silver as a major constituent, are expensive though they melt at lower temperatures compared with iron and copper solders.

Moreover, hard solders previously available have not always been satisfactory despite the mechanical properties they exhibit, particularly in cases where soldered parts are subsequently subjected to heat treatment as often is the case with steel members soldered together.

SUMMARY OF THE INVENTION

In view of the foregoing, the present invention has for its object the provision of a copper-base solder alloy which has a melting point lying between those of conventional hard and soft solders, can be formulated to melt at the lower temperature, is inexpensive compared with silver solders, and, among others, has desirable characteristics as a joining material to hold parts physically together.

According to the present invention, a copper-base solder alloy is provided which is basically a Cu—Mn—Zn ternary alloy comprising from 60 percent to 70 percent of copper, from 15 percent to 40 percent of manganese and from 0 percent or 0.5 percent to 15 percent of zinc, with from 0.05 percent to about 0.5 percent of titanium added as a crystal size refining agent by the effect of inoculation.

DESCRIPTION OF THE PREFERRED EMBODIMENTS

As clearly observed from the photomicrographs of FIGS. 1 to 6, the alloy of the invention generally has a uniform structure including an alpha phase, which is a solid solution of manganese in copper, and alpha manganese, which is a solid solution of copper in manganese, and includes no intermetallic compounds whatever. This apparently means that the alloy exhibits no sudden change in hardness within one and the same specimen and has a uniform and stable distribution of hardness.

Figure 1:
FIGS. 1 to 6 represent photomicrographs illustrating respective examples of the copper-base solder alloy embodying the present invention and respectively having a zinc content of none, 2 percent, 4 percent, 6 percent, 8 percent, and 10 percent.
Figure 2:
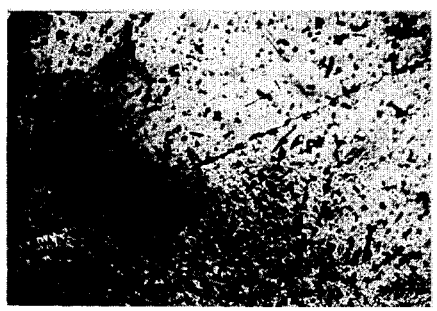
Figure 3:
Figure 4:
Figure 5:
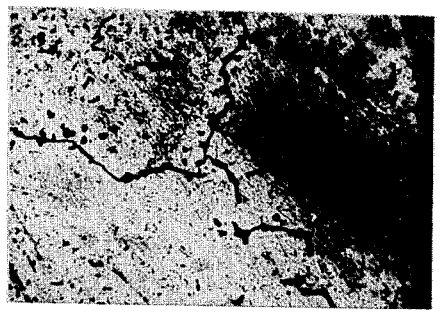
Figure 6:
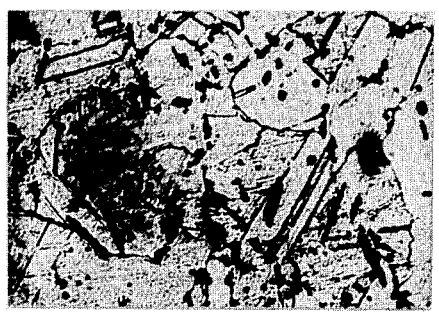
Figure 7:
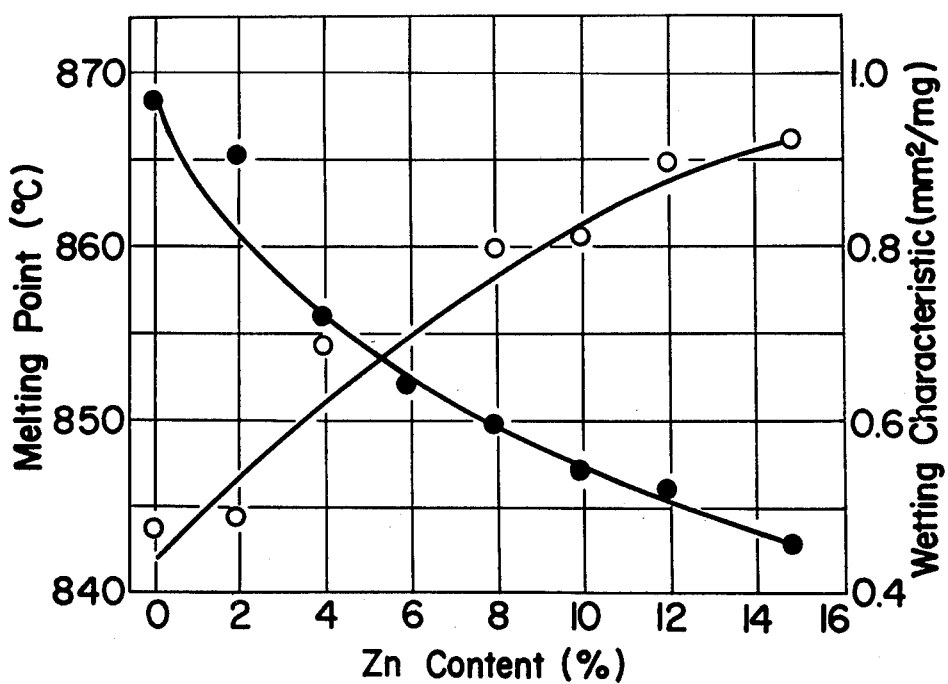
FIG. 7 is a graphical representation of the experiment results obtained with the alloy, showing the effects of the zinc content upon the melting point and wetting characteristic of the alloy.
Figure 8:
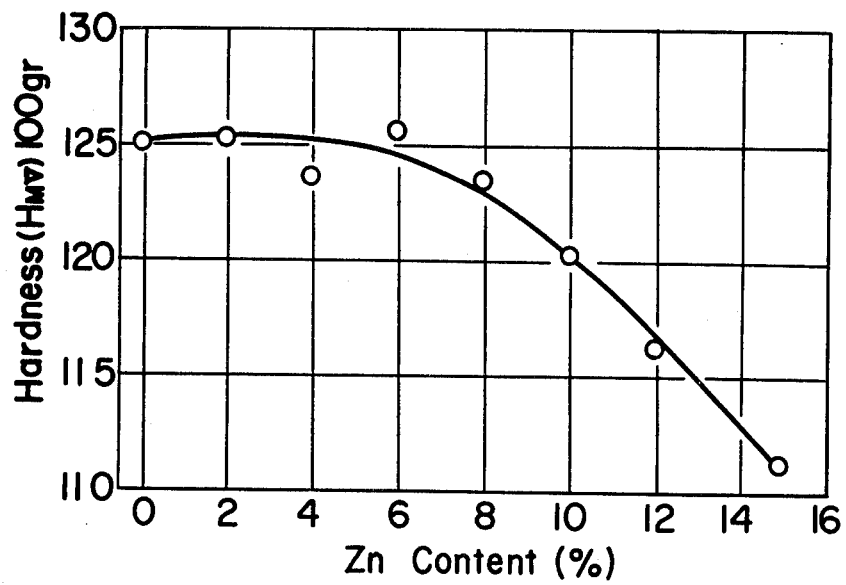
FIG. 8 is another graphical representation of the experiment results obtained with the alloy, showing the relationship of the zinc content with the hardness of the alloy.

The melting point and wetting property of the alloy, both important to its performance as a joining material, can be controlled by varying the zinc content of the alloy, as clearly seen from the graph of FIG. 7, in which the wetting property is plotted in terms of square millimeters per milligram of material. It is to be noted that the alloy has melting characteristics highly desirable for use in joining objects, exhibiting a melting point ranging from 840° C to about 870° C., which is much lower than that of ordinary hard solders, and a relatively narrow temperature range in which liquid and solid coexist. As observed, the melting point of the alloy tends to fall with increase in its zinc content, the wetting property tending to increase therewith. This fact makes the alloy further desirable as a joining material, even though the hardness of the alloy is somewhat reduced with the increase in zinc content, as observed in the graph of FIG. 8.

Figure 9:
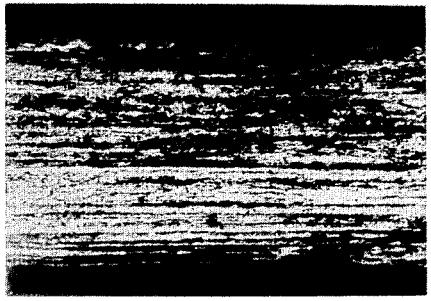
FIGS. 9 and 10 represent photomicrographs showing the structure of the alloy rolled with a reduction rate of 90 percent and 97 percent, respectively.
Figure 10:
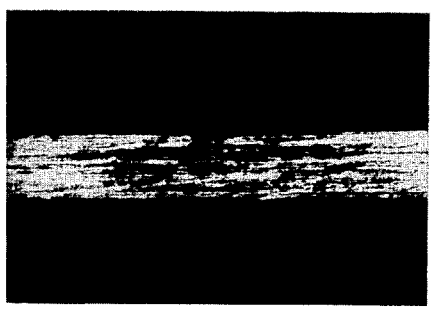
Figure 11:
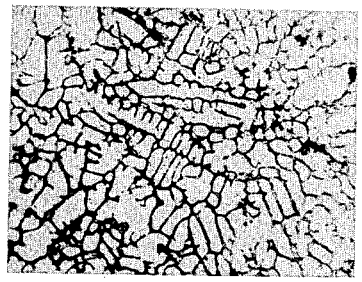
FIGS. 11 and 12 represent photomicrographs showing the fineness of the alloy owing to inoculation resulting from the use of titanium.
Figure 12:
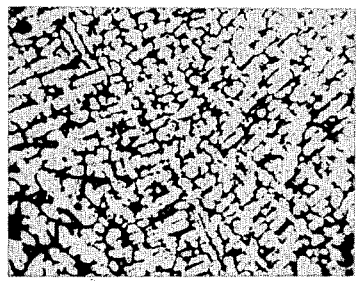

The alloy of the invention has also been found to have a further important mechanical property, that is, an excellent workability, as observed from the photomicrographs of FIGS. 9 and 10, which illustrate with a magnification of ×100 the structure of the copper-base alloy with 35 percent manganese cold-rolled with respective reduction rates of 90 percent and 97 percent. As seen, the rolled alloy has a fibrous structure well oriented in the rolling direction and of uniform distribution. The experiments conducted with the copper-base solder alloy of the invention show that it can be successfully cold-rolled with a reduction rate of not less than 90 percent and without necessitating any strain relieving process in the rolling operation.

It has also been found that the alloy of the invention has a good shock-absorbing property and is thus particularly suitable for use in the joining of parts to be subjected to shock and vibration. As for appearance, it is scarcely colored like copper, and, when polished, exhibits a steel-grey surface almost indistinquishable from that of steel. This aesthetically makes the alloy further suitable for use in joining steel members.

Further, according to laboratory and shop experiments conducted with the alloy of the invention, it has been found that the alloy can be used to advantage as a brazing agent for tipped cutting tools, giving a tool life at least several tens times as long as that obtainable with ordinary silver solder. In the experiments, cemented carbide tips were brazed to tool shanks with the alloy of the invention and the tools thus formed were tested on a heavy cutting lathe. The marked increase in tool life is attributable principally to the increase in tool strength resulting from the shock-absorbing character istic of the alloy used, which makes the tool highly durable under heavy mechanical vibration among concomitant factors in the life increase, stable melting and high temperature characteristics of the alloy of the invention are to be noted.

According to the concepts of the present invention, a copper-manganese-zinc solder alloy is provided having a melting point generally between that of a hard and soft solder alloy as well as good wetting characteristics and hardness. The alloy of the present invention contains from 60 to 70 percent copper, from 15 to 40 percent manganese and from either zero or 0.5 to 15 percent zinc. Additionally, from about 0.05 percent to about 0.5 percent of titanium may be added as a crystal size refining agent which improves the mechanical properties of the alloy. This formulation generally has a melting point of 840° C to about 870° C. The wetting characteristic ranges from 0.48 to 0.92 mm²/mg whereas the hardness ranges from 112 to 126 (Hmv) 100 gr.

Desirably, a preferred range or formulation of the alloy which has been found to have very good melting characteristics and wettability contains from 60 to 64 percent copper, 30 to 34 percent manganese, and from 2 to 10 percent of zinc with preferably from about 0.05 percent to about 0.25 percent of titanium added to refine crystal size. The melting range of this formulation is from 847° C to 865° C. The wetting characteristic ranges from 0.49 to 0.81 mm²/mg and the hardness ranges from 120 to 126 (Hmv) 100 gr.

The range of the formulations along with the specific melting points of the alloy and the wettability, together with the hardness, has been found to give a solder alloy extremely suitable for joining various metals together such as steel and also has been found to have unexpectantly good shock-absorbing properties.

Of course, a trace or small amounts such as up to 0.5 percent of various additives including metals may be utilized in addition to the above noted metals to improve certain properties.

In summary, the present invention provides a copper-base solder alloy which has a melting point lying between those of conventional soft and hard solders and readily controllable by varying the zinc content, is advantageously usable as a joining material in applications requiring mechanically strong and stable joints, and is inexpensive.

What is claimed is:
1. A shock absorbing copper-manganese-zinc solder consisting essentially of from 60 percent to 64 percent of copper, from 30 percent to 34 percent of manganese, from 2 percent to 10 percent of zinc, and from 0.05 percent to 0.5 percent of titanium, said solder having a melting point range of from 847° C. to 865° C., a wettability range of from 0.49 to 0.81 mm²/mg, and a hardness of 120 to 126 (Hmv) 100 gr.
2. The solder of claim 1 in the form of a cold rolled strip.
3. A solder according to claim 1, wherein said alloy includes an alpha phase of a solid solution of manganese in copper, and alpha manganese which is a solid solution of copper in manganese and which alloy includes no intermetallic compounds.

* * * * *